Figure 1:
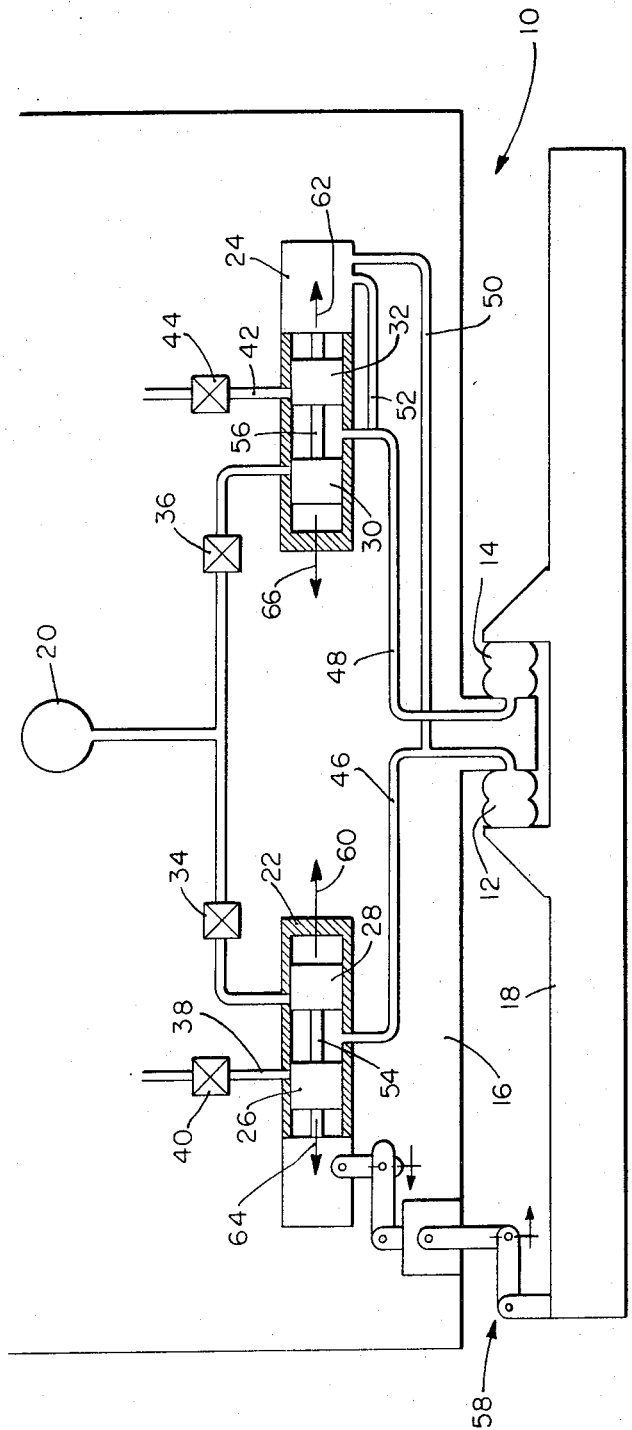

# United States Patent
Herring, Jr.

[15] 3,695,186
[45] Oct. 3, 1972

[54] LATERAL CAR STABILIZING SYSTEM
[72] Inventor: James M. Herring, Jr., Merion Station, Pa. 19132
[73] Assignee: The Budd Company, Philadelphia, Pa.
[22] Filed: July 6, 1970
[21] Appl. No.: 52,312

[52] U.S. Cl. ............105/171, 105/197 B, 105/199 R, 105/210
[51] Int. Cl. ..............B61f 5/10, B61f 5/24, B61f 5/38
[58] Field of Search ......105/3, 4 R, 164, 171, 182 R, 105/197 B, 199 R, 210

[56] References Cited
UNITED STATES PATENTS

| | | |
|---|---|---|
| 3,573,884 | 4/1971 | Pollinger..............105/164 X |
| 2,088,487 | 7/1937 | Schoepf et al............105/210 |
| 2,633,811 | 4/1953 | Poage.....................105/164 X |
| 3,376,830 | 4/1968 | Bingham................105/164 X |

*Primary Examiner*—Arthur L. La Point
*Assistant Examiner*—Howard Beltran
*Attorney*—Thomas I. Davenport, Edward M. Farrell, John D. Sowell, Alford L. Trueax, Jr. and William R. Nolte

[57] ABSTRACT

A lateral stabilizing suspension control system for counteracting lateral unbalancing forces against a railcar includes air springs responsive to such unbalancing forces. Pressurized fluid is applied to or released from the air springs to counteract the unbalancing forces. Means are also provided to assure that the total pressure in the air springs is relatively constant to provide a uniform spring rate during operation.

9 Claims, 5 Drawing Figures

INVENTOR.
JAMES M. HERRING, JR.
BY Edward M Farrell
ATTORNEY

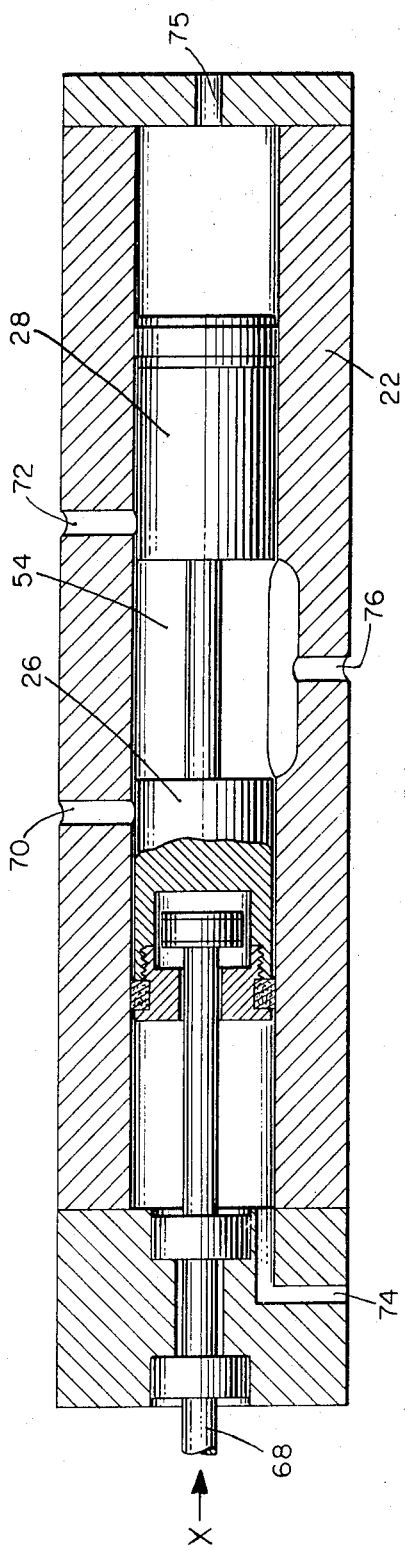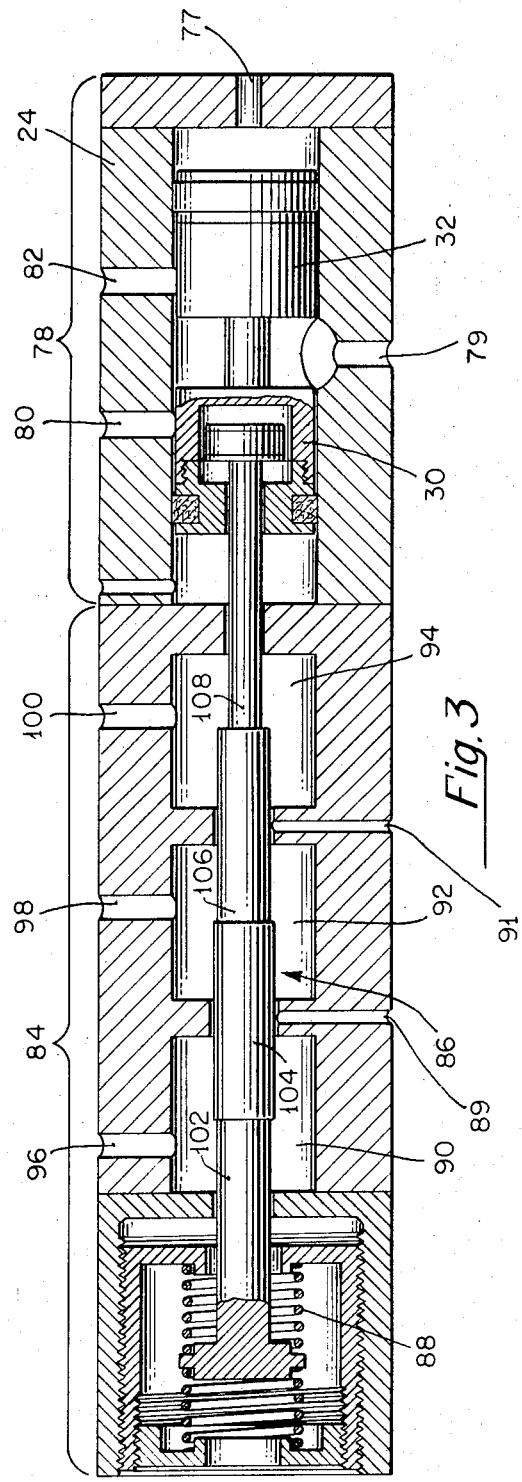

LATERAL CAR STABILIZING SYSTEM

The lateral ride quality of a railcar is of prime importance for at least two reasons. First, the railcar is one of a unique class of vehicles which is susceptible to large lateral input forces due to flange guidance provided in most cars. Second, the tolerance of passengers in railcars to lateral motion is considerably lower than his tolerance to vertical motion or longitudinal motion when seated facing in the longitudinal direction.

In considering systems for overcoming the unbalancing caused by lateral forces in a railcar, it is desirable to utilize means which are already included in the car. Medium pressure air is readily available on most present railcars. Consequently, the use of this air to provide means for compensating for lateral forces is highly desirable. The use of air has a number of advantages since air is a compressible medium and therefore prevents lock-up in the system, as could happen if liquid is used.

In most railcars, the car body is adapted to ride on a truck. The truck includes the wheels which ride over the tracks. During operation, when the railcar is going around turns, the relative movement between the car body and the truck varies considerably. Various control systems have been used in the past to counteract the relative movement between the car body and the truck as the railcar makes turns or is subjected to various external forces such as the wind.

It is an object of this invention to provide an improved lateral suspension control system for counteracting lateral forces exerted against a railcar.

It is a further object of this invention to provide an improved lateral suspension control system for counteracting lateral forces tending to create unbalance in a railcar wherein the spring rate is maintained relatively constant through its operating range.

In accordance with the present invention, a lateral suspension control system is provided for a car body carried by a truck. A pair of air springs is disposed between the car body and the truck. A reservoir supplies pressurized fluid to the air springs. Valves are employed for connecting the air springs to a reservoir or exhaust vent. The valves are actuated in accordance with the relative lateral movement of the car body with respect to the truck to connect the air springs either to the reservoir or exhaust vent to thereby vary the pressures in the air springs to counteract relative movement between the car body and truck. Means are provided to maintain the total pressure in the pair of air springs relatively constant throughout the operating range of the system.

Figure 4:
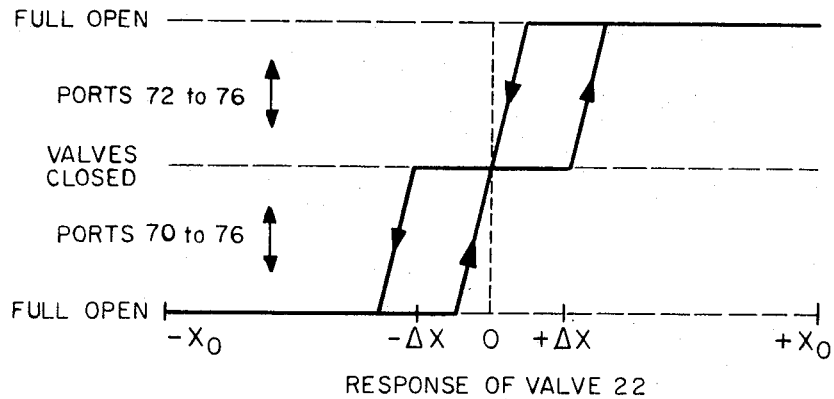
Figure 5:
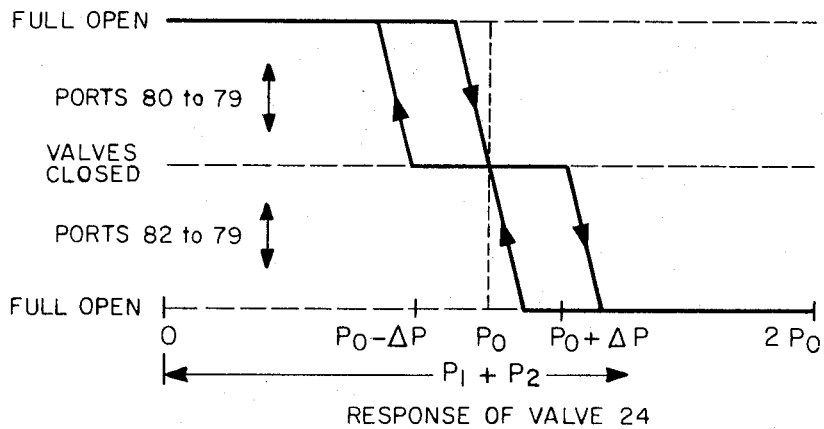

Other objects and advantages of the present invention will be apparent and suggest themselves to those skilled in the art, from a reading of the following specification and claims, in conjunction with the accompanying drawing, in which:

FIG. 1 is a diagram illustrating an overall system, in accordance with the present invention;

FIGS. 2 and 3 are cross sectional views illustrating two types of valves which may be used in the embodiment illustrated in FIG. 1, in accordance with the present invention, and FIGS. 4 and 5 are diagrams shown for the purpose of illustrating the basic operation of the two valves illustrated in FIGS. 2 and 3.

Generally, the subject invention involves a centering system for generating large centering forces in opposition to lateral, centrifugal or wind forces. At the same time, a low lateral spring rate is provided for passenger comfort. The basic system involved in the present invention is a pneumatic mechanical system.

Referring to FIG. 1, the lateral suspension control system 10 includes a pair of air springs 12 and 14 disposed between a car body 16 and a truck member 18. The lateral force transmitted to the car body 16 is equal to the difference of the forces exerted by the air springs 12 and 14. The following formula would apply to such a situation.

$$F = (P_2 - P_a) A_2 - (P_1 - P_a) A_1 \quad (1)$$

$P_2$ = absolute pressure in the right air spring 14;
$A_2$ = effective area of the right air spring 14;
$P_1$ = absolute pressure in the left air spring 12;
$A_1$ = effective area of the left air spring 12;
$P_a$ = atmospheric pressure.

For a small lateral displacement $x$ from the neutral position:

$$P_2 = P_{02} + (\delta P/\delta x)\Delta x \quad (2)$$
$$P_1 = P_{01} - (\delta P/\delta x)\Delta x \quad (3)$$
$$A_2 = A_0 + (\delta A/\delta x)\Delta x \quad (4)$$
$$A_1 = A_0 - (\delta A/\delta x)\Delta x \quad (5)$$

where
$P_{02}$ = nominal pressure of the right air spring 14;
$P_{01}$ = nominal pressure of the left air spring 12;
$A_0$ = nominal effective area of the air springs 12 and 14;

$(\delta P/\delta x)$ and $(\delta A/\delta x)$ are characteristics of a particular air spring installation.

Simplifying and discarding second order terms:

$$F = (P_{02} - P_{01}) A_0 + (P_{02} + P_{01} + 2P_a)(\delta A/\delta x)\Delta x + 2A_0(\delta P/\delta x x) \quad (6)$$

This force can be divided into two terms; the centering force which $F_E$ and the lateral spring rate of the centering device $K_E$ $$F_E + (P_{02} - P_{01}) A_0 \quad (7)$$

$$K_E = (P_{01} + P_{02} - 2P_a)(\delta A/\delta x) + 2A_0 (\delta P/\delta x) \quad (8)$$

The present invention is designed to provide a pressure unbalance between the air springs in response to a lateral positioning error of the carbody relative to the truck and at the same time maintain $P_{01} + P_{02}$ constant. As a result any centering force up to the maximum capacity of the system can be applied while the lateral spring rate remains constant.

A reservoir 20 provides a source of medium pressure air for the air springs 12 and 14. The fluid pressure is applied to the air springs 12 and 14 through main valves 22 and 24 respectively. The valves 22 and 24 comprise cylindrical members each having a pair of piston-like elements disposed therein. The valve 22 includes a pair of piston elements 26 and 28, whereas the valve 24 includes a pair of piston elements 30 and 32. Connecting valves 34 and 36 are connected between the reservoir 20 and the main valves 22 and 24, respectively, and control the rate of flow of the fluid from the reservoir 20 to the main valves 22 and 24.

The valve 22 includes an interior chamber for receiving the pressurized fluid from the reservoir 20. It also includes a conduit 38 leading through a valve 40 to the atmosphere for exhaust. Likewise, the main valve 24 includes an interior chamber for receiving pressurized fluid from the reservoir. It also includes a conduit 42 leading to the atmosphere or exhaust through a valve 44.

The interior chamber of the main valve 22 is connected to the air spring 12 through a conduit 46. In like manner, the interior chamber of the main valve 24 is connected to the air spring 14 through a conduit 48. The air spring 12 is also connected to the valve 24 through a conduit 50. The air spring 14 is also connected to a second portion of the main valve 24 through a conduit 52. The reasons for the additional conduits associated with main valve 24 will be subsequently described in detail in connection with FIG. 3.

In considering the operation of the main valves 22 and 24, consider that the main bodies are fixed with respect to the car body 16. However, the shafts 54 and 56 connected to the valves 22 and 24, respectively, are adapted to be moved within the chambers of the valves 22 and 24. These shafts 54 and 56 are mounted to the truck 18 through a linkage mechanism 58. Consequently, any relative movement of the car body 16 with respect to the truck 18 will be reflected in the movement of the linkage 58, which in turn moves the shafts 54 and 56. Movement of the shafts 54 and 56 result in the relative movement of the pistons within the chambers of the valves 22 and 24. The movements of the various pistons result in pressure being applied to one of the air springs 12 and 14 and pressure being relieved from the other of the air springs 12 and 14.

The valve mechanism 22 responds to lateral position movements once the error exceeds some predetermined minimum. Depending upon the direction of the error, the valve 22 will either vent or pressurize the air spring 12. The valve 22 may be designed with a reset action so that it will remain in the required connective state until the positive error is zero. This reset action prevents constant hunting of the valve increasing its reliability, reducing power consumption and providing error closing.

The main valve 24 regulates the sum of the pressures in the air springs 12 and 14. This valve is designed to maintain $P_1 + P_2$ constant, maintaining a constant lateral spring rate. When the sum of the pressures $P_1 + P_2$ varies a predetermined amount from the desired pressure, the valve 24 will either pressurize or vent the right air spring 14 depending upon the direction of error. This valve has a reset action increasing its reliability, reducing power consumption and providing error closing. Assume a typical operation where the car is travelling down a straight track with the pressures in the air springs 12 and 14 being equal, i.e., $P_1 = P_2 = P_{0-2}$ car body 16 and truck 18 is such that the valve 22 is shifted to a position indicated by an arrow 60. At the same time, the pistons 30 and 32 within the valve 24 will be shifted to the right as indicated by the arrow 62.

Under these conditions, the pistons 26 and 28 within the main valve 22 will permit pressurized fluid from the reservoir 20 to enter the chamber of the valve 22 permitting pressure to be applied to the air spring 12 through the conduit 46. This increases the pressure in air spring 12, i.e., $P_1$ is increased. At the same time, the movement of the pistons 30 and 32 within the main valve 24 causes pressure from the air spring 14 to be applied through the conduit 48, through the valve 24 and into the atmosphere through conduit 42 and valve 44. Consequently, $P_2$ decreases.

As $P_1 - P_2$ increases, the centering force increases until either $P_1 - P_2 = P_0 - P_a$ or $x_0 = 0$. When $x_0 = 0$, the valve 22 will shift to position 2 which is the position illustrated in the FIG. 1. When $P_1 + P_2 = P_0$, the valve 24 will be in the position 2 as illustrated in the drawing in FIG. 1.

As the car returns to a straight track, the valve 22 will shift from the position illustrated in FIG. 1 to a third position indicated by an arrow 64. Likewise, the valve 24 will shift from the position illustrated in FIG. 1 to a position indicated by an arrow 66. This causes the pistons 26 and 28 within the chamber of the valve 22 to shift to permit the pressure from the air spring 12 to be exhausted through the conduit 38 and valve 40. At the same time, the movement of the pistons 30 and 32 in valve 24 will cause pressurized fluid from the reservoir 20 to be applied to the air spring 14. This process will continue until $x_0 = 0$ at which time the valve 22 will shift to its neutral position illustrated in the drawing. When $P_1 + P_2 = P_{0-2}$, the valve 24 will shift to its neutral position indicated in the drawing.

Because of the lengths of the pistons within the valves 22 and 24, a "dead band" area will be present in the system. For example, the pistons must be moved beyond a predetermined distance before either the reservoir or exhaust valve is coupled to the chamber. There is a period of time, called "dead band" where neither the reservoir nor exhaust valve is coupled to the chamber.

In addition to the dead band area there is a reset area wherein no movement of the pistons will take place within the chambers, as will be illustrated and described in connection with FIGS. 2 and 3.

The dead band $\Delta x$ and $\Delta P$ and the reset action of the valves 22 and 24 are used to prevent constant hunting of the control.

Referring particularly to FIG. 2, the valve 22 is illustrated in detail. The pistons 26 and 28 are driven by an input shaft 68 to open or close their respective ports 70 to 76 or ports 72, 76 dependent upon the direction of shaft movement. As illustrated in FIG. 1, the port 70 may be connected to an exhaust valve 40 and the port 72 may be connected to the reservoir 20 through the valve 34. Vent openings 74, 75 are provided to eliminate pressure build-up within the chambers as a result of leaking which might develop between the pistons and interior walls of the valve.

A feature relating to the reset operation involves the use of a hollow piston 26 having an actuator element 71 disposed within the piston 26 on the end of the shaft 68 in the manner illustrated. The actuator element 71 must move back and forth predetermined distances before physical contact is made to move the piston 26 in the manner discussed in connection with FIG. 1. It is noted that piston 26, shaft 54 and piston 28 are connected to each other and move as a single piece.

Referring particularly to FIG. 3, the details relating to the valve 24 are illustrated. The valve 24 may be considered as being made of two separate sections. A first section 78 illustrated within the brackets, includes the pistons 30 and 32 as described in connection with FIG. 1. The pistons 30 and 32 are adapted to open and close ports 80 to 79 and 82 to 79, dependent upon the direction of movement of the shaft 86. As described in connection with FIG. 1, the port 80 may lead to the reservoir 20 and the port 82 may lead to the exhaust valve 44. A port 79 may be connected to the air spring 14 through the conduit 48. The operation of the mechanism 78 is basically similar to the operation of the valve 22.

A feature of the reset action, not discussed in connection with FIG. 1, includes an actuator element 73 disposed within a hollow chamber of the piston 30. The element 73 is disposed to be moved freely back and forth within the piston 30 prior to making physical contact to move the piston 30 in the manner discussed in connection with FIG. 1.

A second portion of the main valve 24 may be considered that part of the mechanism within a bracket 84. This is the part of the mechanism which considers the various pressures from the two air springs 12 and 14 as well as the total pressure applied from the reservoir. Its operation will assure that the total pressure in the two air springs 12 and 14 will remain constant during operation. This in turn assures a relatively constant spring rate.

The mechanism 84 includes a main shaft 86 which is broken down into sections of different diameters. The shaft 86 is normally maintained in a neutral position by a bias spring 88. The shaft 86, however, is free to move to the left or right depending upon the applied forces to the different sections of shaft, as will be described.

The mechanism 84 includes three cylindrical chambers 90, 92 and 94. The chambers 90, 92 and 94 are associated with ports 96, 98 and 100, respectively. The port 96 is connected to a source representing the sum of the two pressures from the air spring 12 and 14. This pressure, for example, could be the pressure from the reservoir 20. The port 98 is connected to the air spring 12 and the port 100 is connected to the air spring 14. Generally, the mechanism 84 is designed to assure that the total pressure entering into the chambers 92 and 94 is maintained constant during operation.

The shaft 86 is sub-divided into a number of sections 102, 104, 106 and 108. The portion 102 extending from the spring 88 into the chamber 90 is smaller in diameter than the portion 104 which extends from the chamber 90 into the chamber 92. Because of the difference in diameter between the sections 102 and 104, the section 104 includes a radial portion at its end subject to pressure exerted thereon. Fluid under pressure within the chamber 90 will tend to exert an axial force against the enlarged radial portion of the section 104 tending to move the shaft 86 to the right.

The section 106, extending between the chambers 92 and 94 and connected to the right end of the section 104, is also smaller in diameter than the section 104. Consequently, pressure within the chamber 92 will tend to exert a force to the left against the radical larger portion of section 104. Because of the enlarged ends of the section 104 with respect to the diameters of sections 102 and 106, the pressure within the chamber 92 tends to force the shaft 86 to the left while pressure in the chamber 90 tends to force the shaft to the right.

The section 108 is smaller in diameter than the section 106. As a result, pressurized fluid within the chamber 94 will tend to exert a force on the enlarged end of section 106 tending to move the shaft 86 toward the left. The force acting on the section 106 in chamber 94 is in the same direction as the force exerted on the section 104 within the chamber 92. Consequently, the forces within the chamber 92 and 94 tending to move the shaft 86 to the left both oppose the force exerted within the chamber 90 tending to move the shaft 86 to the right.

The pressure within the chamber 90 represents the total pressure from springs 12 and 14. This could be the pressure from the reservoir 20. The pressure within the chamber 92 represents the pressure from the air spring 12. The pressure within the chamber 94 represents the pressure from the air spring 14. When the total pressure within the chamber 90 is equal to the pressures within the chambers 92 and 94, the shaft 86 will be in equilibrium or neutral position. As previously mentioned, the bias spring 88 tends to maintain the shaft 86 in this neutral position.

Vents 89 and 91 serve to isolate the chambers 90, 92 and 94 from each other.

Referring particularly to FIG. 4, the distance required for actuation of the valve 22 is illustrated. When the pistons 26 and 28 within the valve 22 are moved a predetermined distance, the inner chamber of the valve 22 is connected to either the reservoir or exhaust through ports 72 and 70, respectively. The air spring 12 is connected to the interior of the valve 22 through port 76.

Referring to FIG. 5, the response of the valve 24 is illustrated. The ports 80 and 82 are connected to the exhaust or reservoir. The port 79 is connected to the air spring 14.

FIGS. 4 and 5 illustrate the fact that no action will take place until some predetermined minimum movements are attained. This is because of the distances moved by the pairs of pistons within the valves 24 and 26. These pistons must be moved predetermined distances before the associated ports are opened or closed. The advantage is not having the valves 22 and 24 operate immediately upon small changes is that hunting in the system will be minimized.

The present invention has provided an arrangement wherein counteracting forces to minimize lateral movements of a car body with respect to a truck is provided. At the same time, by maintaining the pressures within the two air springs constant, the spring rate of the system will remain relatively constant during operation. This greatly enhances the comfort of the passengers in riding the train.

What is claimed is:

1. A lateral suspension control system for a car body carried by a truck comprising first and second air springs disposed between said car body and said truck, a reservoir for supplying pressurized fluid to said air springs, first and second valve mechanisms for connecting said first and second air springs, respectively, to either said reservoir or to an exhaust vent, means for simultaneously actuating both said first and second valves in accordance with the relative lateral movement between said car body and said truck to connect said first and second air springs either to said reservoir or to said exhaust vent to vary the pressures in said first and second air springs to counteract lateral forces tending to produce relative movement between said car body and said truck, and means connected to said second valve mechanism to maintain the total pressures in said first and second air springs constant during operation.

2. A lateral suspension control system as set forth in claim 1 wherein said first and second valve mechanisms each comprise a cylindrical housing having a pair of reciprocating pistons therein for blocking or unblocking ports leading to said reservoir or said exhaust vent.

3. A lateral suspension control system as set forth in claim 2 wherein means are provided to delay the movement of said pistons until actuating elements for said pistons have moved beyond predetermined distances.

4. The invention as set forth in claim 3 wherein said means to delay the movement of said pistons include said actuating elements disposed within chambers of said pistons.

5. A lateral suspension control system as set forth in claim 2 wherein said means connected to second valve includes three chambers for received pressurized fluid from said first air spring, said second air spring and said reservoir, respectively.

6. A lateral suspension control system as set forth in claim 5 wherein said second valve mechanism includes means for controlling the pressure within said second air spring.

7. A lateral suspension control system as set forth in claim 6 wherein a common control element is provided in said second valve mechanism for controlling the pressure in said second air spring and for maintaining the total pressure in said first and second air springs relatively constant.

8. A lateral suspension control system as set forth in claim 7 wherein means are provided to bias said common element to a normally neutral position.

9. A lateral suspension control system as set forth in claim 8 wherein said common element in said second valve mechanism extends through said three chambers and is connected to control the operation of said pair of reciprocating pistons within the cylindrical housing of said second valve mechanism.

* * * * *

PO-1050
(5/69)

UNITED STATES PATENT OFFICE
CERTIFICATE OF CORRECTION

Patent No. 3,695,186          Dated October 3, 1972

Inventor(s) James M. Herring, Jr.

It is certified that error appears in the above-identified patent and that said Letters Patent are hereby corrected as shown below:

Column 3, line 56, after "$P_o$-2" insert --. At this point, the relative movement between the --.

Signed and sealed this 2nd day of July 1974.

(SEAL)
Attest:

EDWARD M. FLETCHER, JR.
Attesting Officer

C. MARSHALL DANN
Commissioner of Patents